H. G. Pearson,
Screw & Nut.
No. 113,567. Patented Apr. 11, 1871.
Fig. 1.   Fig. 2.   Fig. 3.
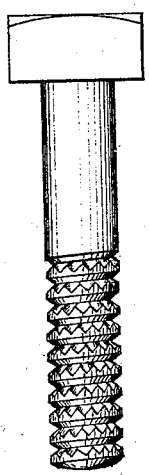
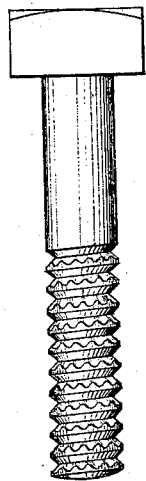
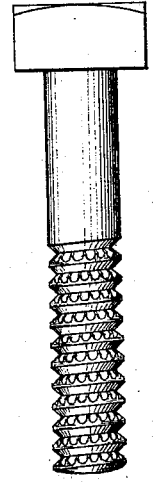
Fig. 5.
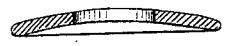
Fig. 4.   Fig. 6.   Fig. 7.
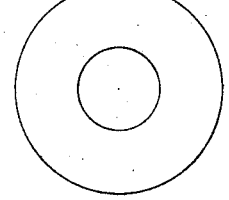
Witnesses:
W. Bradford.
T. C. Brecht.
Henry G. Pearson, Inventor:
by John J. Halsted
his atty
N. PETERS, PHOTO-LITHOGRAPHER, WASHINGTON, D. C.

United States Patent Office.

HENRY G. PEARSON, OF NEW YORK, N. Y.

Letters Patent No. 113,557, dated April 11, 1871.

IMPROVEMENT IN METAL SCREWS AND NUTS.

The Schedule referred to in these Letters Patent and making part of the same.

*To all whom it may concern:*

Be it known that I, HENRY G. PEARSON, of the city, county, and State of New York, have invented certain Improvements in Metal-Screws, and Nuts for the same; and I do hereby declare that the following, taken in connection with the drawing which accompanies and forms part of this specification, is a description of my invention sufficient to enable those skilled in the art to practice it.

My invention consists in a novel formation of the thread of a screw or bolt to enable it the better to hold its position when subjected to jars and jolts, without turning in the nut or other object in which it is inserted; in a corresponding formation of the threads of a nut applicable to be used with such a screw or bolt; and in combining with such a nut a convex steel washer, as hereinafter set forth.

I make my screw with a series of indentations or grooves, either on one or both sides of its thread, at option.

These indentations may be either in the form of an angular zigzag, as shown in Figure 1; or in a wavy form, as seen in Figure 2; or in a series of grooves, as seen in Figure 3; or in any other desired form.

It will be seen that this construction admits of readily screwing the screw to place, but offers a firm and positive resistance against its getting accidentally loosened by being turned backward.

Figure 4 illustrates a nut constructed as a counterpart of the screw or bolt, having its thread notched on one face or side correspondingly with fig. 3.

Only one form of notch is shown, but the thread may have its series of notches or indentations of any appropriate configuration adapted to that of the bolt or screw.

Figure 5 is a central section; and

Figure 6, a plan of a concave metal washer, preferably of steel, designed to be used in some cases in connection with my improved nut, and placed between the nut and the object held by the screw and nut.

Its object is to secure a still tighter hold by tending, when compressed, to force the swells or elevations of the thread of the screw into the corresponding depressions or cavities on the thread of the nut, and *vice versa*.

Instead of such a washer an India-rubber or other elastic washer may be used.

Figure 7 shows in section, and Figure 8 in plan, one of my improved notch-threaded nuts, with one of these metallic concave washers loosely affixed thereto. I connect them as follows:

On that side of the nut which is to bear against the object held or fastened, a shallow depression, a little deeper than the thickness of the washer, is made, circular, square, or otherwise, as the case may be, to conform to the form of the washer, and slightly grooved to receive its edge. The washer is then inserted therein, its convex face projecting beyond the face of the nut, as seen in the figure; and to secure it to place a few blows or indentations at the edge of the depression will expand the metal at such points sufficiently to overlap the washer and keep it in its place; or punch-holes may be struck around in several places. It must lie loosely enough in its seat to permit its edge, when the washer is temporarily flattened by screwing the nut against a surface, to spread at its edges, and also when released to resume its normal position.

In some cases I slit or cut the washers from either their inner or outer edge nearly through to the other edge, in order to render them more elastic. One of these convex washers may, if desired, be lodged in each face of the nut.

My invention is applicable in almost every branch of the arts where bolts and nuts or male and female-screws are used. It will be found especially valuable in all cases where there is much motion and jarring of the machinery, and a consequent tendency to a loosening of the parts; as, for instance, in axle nuts, to prevent the wheels of vehicles from running off; in water-faucets, the screws of which should be held permanently to prevent leakage; in connecting the valve-plate to the valve-stem in a steam-engine; in securing fish-plates to connect the ends of railway-rails, &c.

I claim—

1. A bolt or screw having a series of indentations on one or both sides of the thread, substantially as described, in such manner that the indentations will act as a series of detents, for the purpose set forth.

2. A nut having a series of indentations on its thread, substantially as described, and adapted for use in connection with a bolt or screw indented as described.

3. Such a nut, when used in connection with a loose convex steel-washer, or its equivalent, as described.

HENRY G. PEARSON.

Witnesses:
JOHN J. HALSTED,
W. BRADFORD.